US009577851B2

(12) United States Patent
Jacquet

(10) Patent No.: US 9,577,851 B2
(45) Date of Patent: Feb. 21, 2017

(54) ACTIVE SIGNALING IN A COGNITIVE WIRELESS TELECOMMUNICATION NETWORK

(71) Applicant: Alcatel Lucent, Boulogne Billancourt (FR)

(72) Inventor: Philippe Jacquet, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/652,994

(22) PCT Filed: Dec. 4, 2013

(86) PCT No.: PCT/EP2013/075564
§ 371 (c)(1),
(2) Date: Jun. 17, 2015

(87) PCT Pub. No.: WO2014/095374
PCT Pub. Date: Jun. 26, 2014

(65) Prior Publication Data
US 2015/0341191 A1 Nov. 26, 2015

(30) Foreign Application Priority Data
Dec. 17, 2012 (EP) .................................... 12306595

(51) Int. Cl.
*H04L 25/03* (2006.01)
*H04W 74/08* (2009.01)
(Continued)

(52) U.S. Cl.
CPC ..... *H04L 25/0384* (2013.01); *H04W 74/0816* (2013.01); *H04W 16/14* (2013.01); *H04W 84/02* (2013.01)

(58) Field of Classification Search
CPC ... G06N 5/02; H03D 1/00; H04B 1/06; H04B 7/00; H04J 1/16; H04L 12/24;
(Continued)

(56) References Cited

U.S. PATENT DOCUMENTS 8,149,865 B2 * 4/2012 Choi ..................... H04L 12/413
370/329
2002/0163933 A1 * 11/2002 Benveniste ............. H04L 47/10
370/465

(Continued)

OTHER PUBLICATIONS

E. Del Re, "Energy Efficient Techniques for Resources Allocation in Cognitive Networks", May 2012.*
(Continued)

*Primary Examiner* — Shawkat M Ali
(74) *Attorney, Agent, or Firm* — Fay Sharpe, LLP

(57) ABSTRACT

A method for choosing the sequence of bursts of an access pattern in the primary network of a cognitive wireless network comprising a primary and a secondary network, wherein this access pattern comprises an alternation of listen periods and signaling transmission periods, these periods having various lengths; comprises the steps of computing a random integer X, and then generating a sequence of bursts corresponding to the computed random integer X. In a peculiar embodiment, the random integer X has a geometric distribution with a given probability p.

3 Claims, 8 Drawing Sheets

(51) Int. Cl.
*H04W 16/14* (2009.01)
*H04W 84/02* (2009.01)

(58) Field of Classification Search
CPC ..... H04L 12/26; H04L 12/28; H04L 25/0384; H04L 27/00; H04L 27/28; H04W 4/00; H04W 16/14; H04W 72/04; H04W 74/0816; H04W 84/02
USPC ....... 370/231, 235, 252, 254, 329, 330, 351, 370/447, 466; 375/219, 237, 260, 295, 375/316, 340; 455/509, 513, 522; 706/46
See application file for complete search history.

(56) References Cited

U.S. PATENT DOCUMENTS

| | | | | |
|---|---|---|---|---|
| 2008/0130519 A1* | 6/2008 | Bahl | ................... | H04L 12/2602 370/254 |
| 2008/0198948 A1* | 8/2008 | Tang | ..................... | H04W 72/02 375/316 |
| 2008/0317062 A1* | 12/2008 | Timmers | ............... | H04W 72/02 370/462 |
| 2009/0040974 A1* | 2/2009 | Goldhamer | ........... | H04W 74/02 370/329 |
| 2011/0032892 A1* | 2/2011 | Bahl | ..................... | H04L 5/0032 370/329 |
| 2012/0257585 A1* | 10/2012 | Sydor | ................. | H04W 72/082 370/329 |
| 2014/0214743 A1* | 7/2014 | Chester | ................. | G06N 5/043 706/46 |

OTHER PUBLICATIONS

J. Lunden, "Spectrum Sensing in Cognitive Radios Based on Multiple Cyclic Frequencies", Aug. 2007.*

Philippe Jacquet et al., "Cognitive networks: a new access scheme which introduces a Darwinian approach," Wireless Days, IEEE, pp. 1-6, XP032298475, Nov. 21, 2012.

Constantine Coutras, "Modifying the HIPERLAN/1 CAC Layer Protocol for Intermittent Connectivity," 2010 International Congress on Ultra Modern Telecommunications and Control Systems and Workshops (ICUMT), IEEE, pp. 722-727, XP031841028, Oct. 18, 2010.

Philippe Jacquet, "On (d, k) Sequences Not Containing A Given Word," 2006 International Symposium on Information Theory, IEEE, pp. 1486-1489, XP031032461, Jul. 1, 2006.

Philippe Jacquet et al., "Priority and Collision Detection with Active Signaling—The Channel Access Mechanism of HIPERLAN," Wireless Personal Communications, vol. 4, No. 1, pp. 11-26, XP002696796, Jan. 31, 1997.

International Search Report for PCT/EP2013/075564 dated Jan. 16, 2014.

Philippe Jacquet et al., "Cognitive networks: a Darwinian approach", Research Report, RR-7892, Inria, Hal Id:nal-00672995, Feb. 22, 2012, 20 pages.

* cited by examiner

Solid line corresponds to the invention.

ACTIVE SIGNALING IN A COGNITIVE WIRELESS TELECOMMUNICATION NETWORK

BACKGROUND OF THE INVENTION

Field of the Invention

The present invention generally relates to cognitive wireless telecommunication networks.

A cognitive network is a network with a cognitive process that can perceive current network conditions; and plan, decide, act on those conditions, learn from the consequences of its actions, all while following end-to-end goals. A cognition loop senses the environment, plans actions according to input from sensors and network policies, decides which scenario fits best its end-to-end goals using a reasoning engine, and finally acts on the chosen scenario. The system learns from the past (situations, plans, decisions, actions) and uses this knowledge to improve the decisions in the future.

A cognitive wireless networks is a radio network where each band of frequency is occupied by two groups of users: the primary users that form a primary network and the secondary users that form a secondary network. The primary users are supposed to have priority over the secondary users: i.e. the performance of the primary network should be protected against the traffic of the secondary network, i. e. the performance of the primary network should be guaranteed independently of the demand from the secondary network. Furthermore, the throughput and occupancy of the secondary network should vanish when the traffic load of the primary network increases. In other words the secondary users are only allowed to take the blank periods left by the primary users.

Economically, the existence of cognitive wireless networks is justified by the fact that many spectra are not fully used by their dedicated users, and therefore allowing secondary user access will give the opportunity to fully use the bandwidths and provide more spectrum to users. This is particularly true when part of the bandwidth is reserved for applications that have not yet been developed. The time necessary for such applications to come on to market may be long or may simply never occur (due to reasons other than technological), and precious bandwidth may simply be wasted for a substantially long period. Therefore the Federal Communication Commission has decided that any bandwidth dedicated to a new usage should also accept secondary users in the context of cognitive networks.

The problem is that the protocol used by the primary users, hereafter called the primary protocol, has in general a design that does not take into account the secondary users. In consequence the secondary protocol is sometimes harder and more costly to design than the primary protocol. Indeed the secondary users would need to be aware of the main elements of the protocol of the primary users in order to knowledgeably give priority to the later. The technological burden is thus on the secondary users while the market domination is guaranteed to the primary protocols. The result is that the spectrum may not be efficiently used and the initial goal of cognitive regulation will not be fulfilled in economic terms.

An alternative approach consists in identifying an already standardized protocol for the secondary users, for example the IEEE 802.11 standards, and then giving the burden of designing a primary protocol that naturally preempt the secondary protocol. Pre-empting the IEEE 802.11 standard is not difficult: it suffices to define a primary protocol with smaller distributed inter-frame spaces (DIFS). With this strategy the advantages are:

1) The success to market of the secondary protocol is guaranteed, since the secondary protocol is already available; therefore the spectrum is immediately fully used.

2) The technological investment for the primary protocol is guaranteed by its enforced priority over the secondary protocol.

We will consider a strategy where the sharing rules are mostly implemented in the primary network. Usually the secondary network encompasses mechanisms which allow this network to resume its transmission if the primary network is not using the channel.

We will consider a secondary network that uses the IEEE 802.11 decentralized MAC scheme. The key is a preemptive access implemented in the primary network. When both networks coexist, the secondary network captures the bandwidth when there is no activity in the primary network and in a given area (or if there is even no network nodes at all). The secondary network can use the bandwidth without any modification to its normal mode of operation.

In such a cognitive radio network, we can distinguish two different issues:

1) The first issue is sensing, which is a key feature in cognitive radio networks since it allows the secondary network to be aware of the existence of primary nodes within a given area.

2) The other issue is medium access, which is also a central issue since smart access techniques can be used by cognitive radio networks to efficiently share the medium.

Description of the Prior Art

For instance the article "Priority and Collision Detection with Active Signaling—The Channel Access Mechanism of HIPERLAN" by Philippe Jacquet, Pascale Minet, Paul Mühlethaler and Nicolas Rivierre, in Wireless personal communication 1997, http://www.springerlink.com/content/n34103q456885g51/ describes a known method for priority and collision detection with active signaling in a HIPERLAN network. In this known method, the active signaling consists, for each node wanting to access the medium, to transmit an access pattern of non-data signals in preamble to each data packet transmission attempt. This access pattern basically consists into an alternation of two listen periods separated by one signal period, these periods having various lengths. The signal transmitted in pattern signal period contains no data at all.

The procedure of collision detection and conflict resolution is performed during the access pattern preamble. The rule is that when a node, in one of its pattern listen periods, detects some energy from another node, then it immediately aborts its own access pattern preamble, and defers its packet transmission for a next attempt. Otherwise the node transmits its packet at the end of the access pattern transmission.

When a transmission attempt starts, each node in competition selects a new access pattern with the objective of having it different of the other ones. The access patterns are also functions of access priority assigned to the packet by upper level MAC data transfer services. Clearly if two nodes have two different access patterns, then the listen and signal periods, and the eventual packet transmission periods will not coincide. Therefore, providing all the nodes start access pattern preambles at the same time, one of the nodes in listen period will necessarily be the first to detect energy from another node and will defer in order to let the latter transmit its packet safely.

This is collision detection, but since it is performed before the packet, packet transmission is safe. One says that the nodes have been separated by their patterns.

The node that has priority to transmit its packet is the one holding the pattern which presents the largest digital number expanded in binary, if a pattern time slot is coded with a "1" when it is in a transmit time slot, and a "0" when it is in a listen time slot. Synchronization of pattern preambles is obtained by forcing each pattern to start after the end of frame of the last transmitted packet on the channel.

The pattern selection is such that patterns applied for high priority packets is always greater than patterns applied to lower priority packets.

As mentioned above, an interesting option for a cognitive wireless network is a secondary network according to IEEE 802.11 (WiFi).

FIG. 1 represents an exemplary burst of data packets in a classical secondary network based on the IEEE 802.11 decentralized medium access scheme. It performs the carrier sense during a random time interval. It uses a backoff i. e. a time interval used to space out repeated retransmissions of a same packet of data: The end of the transmission of a packet A by a first node of the secondary network is followed by a short interframe space SIFS and then an acknowledgement packet ack, for point-to-point packets.

After the acknowledgement packet ack, the other nodes which are waiting to transmit a packet must wait for a distributed interframe space DISF to start decrementing their backoff. This mechanism requires that the duration of a SIFS is smaller than the duration of a DISF. With this condition, the backoff is not decremented between a packet and its acknowledgement. The timing of the backoff procedure follows a time unit called "slot", same duration as a DIFS. Any node which has pending data packets waits during the distributed inter-frame space DIFS. After the end of the distributed inter-frame space DIFS, the first node keeps waiting for a random number of slots (it decrements its backoff time). In this example it waits during four slots. After this time interval elapses, the first node sends a second packet B.

If a second node starts sending a packet before the first node has finished decrementing its backoff, the first node resumes decrementing its backoff after the end of the current transmission made by the second node.

We have an example of this situation in FIG. 1. The first node transmits a packet A. A second node has a backoff of four slots before it transmits a packet B.

Thus the second node sends its packet B after the end of the packet A transmitted by the first node (including the acknowledgement for point-to-point packets) and after waiting for four slots.

A third node transmits its packet C after an initial backoff of six slots. Thus the third node waits for the end of the second station's transmission and waits for its two remaining slots before sending its packet C.

A fourth node had an initial backoff of nine slots. Thus the fourth node waits for the end of the third station's transmission and then waits for its three remaining slots before sending its packet D.

FIG. 2 represents an exemplary burst of data packets in a classical secondary network using a generalized carrier sense multiple access technique with active signaling, which is the original basis of the known protocol HiPERLAN type 1. Rather than performing the carrier sense during a random time interval, it consists in allowing the protocol to switch between periods of signaling transmission and periods of sensing, during the signaling period. The fundamental rule of carrier sense medium access remains the same: as soon as the sensed energy is above a given threshold, then the node quits the selection process and waits for the end of the current transmission of a data packet to start competing again.

A simple way to describe the node's activity during the signaling period is to code the signaling period with "1" or "0": 1 represents a transmission interval and "0" a sensing interval. Thus the signaling burst "101" is composed of a transmission period, a sensing period and another signaling period.

The interframe between a packet and its acknowledgement ack is still a short interframe space SISF but the time interval between the end of the acknowledgement ack and the beginning of the active signaling part is called a burst interframe space BIFS. We assume that every node always uses the same binary sequence during its signaling period, to govern its access, and we call this sequence the node access sequence.

On FIG. 2, the transmission of a packet E is followed by a short interframe space SIFS, then an acknowledgement ack, and then a burst interframe space BIFS. Then an active signaling burst is sent before sending a packet F. This active signaling burst can be represented by the binary sequence "111001110000110" in this example. The transmission of the packet F is followed by a short interframe space SIFS, and then an acknowledgement ack.

The sensing rule is such that the node with the highest binary sequence is selected for transmission. Then the second highest binary sequence is selected and so on. Of course the nodes with larger access sequences would have more access opportunities than nodes with smaller access sequence. To cope with this fairness issue, we can add the following rule: the same node must observe an idle interval of at least one large burst interframe space LBIFS, to be allowed to start its signaling phase.

In order to preserve the priority of the primary network over the secondary network, the duration of the large burst interframe space LBIFS must be chosen smaller than the duration of the distributed interframe space DIFS. The duration of the large burst interframe space LBIFS should also be larger than the duration of burst interframe space BIFS. This implies that nodes even with smaller access sequence than the access sequence used by node currently transmitting a data packet will have opportunities to send their packets. This mechanism creates "epochs", two successive epochs being separated by an idle period with duration of at least one burst interframe space BIFS.

A possible solution to obtain a fair access is to draw the binary sequences, used in the primary network, as predetermined fixed sequences. In this case the user must not attempt to access the network before all the other contending nodes have sent their packets. So there will be timing constraints to insure that the secondary network nodes only get access to the channel when the primary network nodes have no traffic to send. The first constraint is that the BIFS is smaller than the distributed interframe space DIFS. This gives a prioritized access to the primary network nodes.

Moreover, to insure that a burst interframe space BIFS followed by listening bursts can not be interpreted as a distributed interframe space DIFS, it is sufficient that the duration of the burst interframe space BIFS plus the duration of the beginning of listening bursts at the head of the binary sequence is smaller than the duration of the DIFS. If we satisfy this constraint, the generalized carrier sense multiple access technique used for the primary network will preempt the access of a secondary user using the decentralized IEEE 802.11 MAC protocol.

However another constraint is necessary to ensure that the secondary network cannot insert transmissions in the signaling period of the primary network: The binary sequence used in the primary network must not contain too many successive zeros. The duration of a sequence of listening coded by successive zeros should be shorter than a burst interframe space BIFS. In this case, the nodes using the IEEE 802.11 access scheme do not start decrementing their backoff during the sensing intervals of the signaling bursts of the primary network, and no packet of the secondary network can be inserted. The following table presents exemplary values used in the IEEE 802.11 for the SIFS, BIFS, LBIFS, and DIFS.

|  | Duration |
|---|---|
| One signaling burst | 9 μs |
| SIFS | 10 μs |
| BIFS | 30 μs |
| LBIFS | 40 μs |
| DIFS | 50 μs |
| Mini slot | 5 μs |

For a primary network of size N, it consists in generating each of the N access patterns as a (d, k) binary sequence. A (d, k) binary sequences contains a string of '0' where 0 appears at least d times and at most k times between two successive '1'. For instance, d=0 and the maximum value of k can be easily computed with the duration $d_{DIFS}$ of the distributed interframe space of the IEEE 802.11 MAC scheme, and the duration $d_{RX}$ of the receive to transmit turnout time, also called mini slot:

$$k = d_{DIFS}/d_{RX}, \text{ for example 5 μs}$$

If the primary network uses the carrier sense multiple access technique with active signaling and (0; k1) binary sequence, then we are sure that during the signaling period of a primary network node there is no listening period (i.e. idle period) of length greater than $d_{DIFS}$. In other words, the IEEE 802.11 access scheme cannot start decrementing its backoff in the signaling period of the primary network, and thus no transmission can be inserted in the active signaling period of the primary network. So the primary users should transmit preamble patterns comprising a sequence of signaling burst chosen so that:
1. The signaling bursts are separated by less than the WiFi distributed inter-frame space (DIFS) time interval, in order to predate WiFi access. Indeed DIFS is the minimal time interval a WiFi node must sense the channel idle before initiating a transmission.
2. The sequence of signaling bursts identifies the primary user in order to prevent collisions.

The terminal that transmits the lexicographically highest sequence is the winner of the contention.

Assuming that a primary user can detect an idle period of length equal to the distributed Interframe space DIFS divided by some integer k, that we will call micro-slot. For instance we suppose k=10. Therefore there are k different possible positions for the first signaling burst. The signaling burst with no micro-slot before it is lexicographically the highest. Assuming n contenders, the average number of users actually transmitting their first signaling burst is equal to:

$$\frac{1 + (n-1)/2}{k}$$

when the two above mentioned conditions are satisfied.

The number of users transmitting their second signaling burst is equal to:

$$\frac{1 + (n-1)/2}{k^2} etc.$$

A computation shows that the theoretical minimal length of the (d, k) sequence needed to encode N distinct access sequences (i. e. uniqueness of each preamble sequence), according to this second possible solution, is equal to log N in order to guarantee a collision free access for a primary network of size N.

FIG. 3 represents graphs of the average number of users simultaneously transmitting their $i^{th}$ signaling burst, for i=1 to 6, from left to right, versus the number of users ($10^x$), on logarithmic scales, when each of the patterns is chosen as a (d, k) binary sequence, and so that all the patterns satisfy the two above mentioned conditions.

These graphs show that, according to this possible solution, the average number of users simultaneously transmitting their $i^{th}$ signaling burst is growing rapidly with the number of transmitters. According to this prior art solution, sorting users in a primary network of size N would require sequences with log N signaling bursts which is good as long as N is not huge.

The drawback of this prior art solution is the number of users that will simultaneously transmit their signaling bursts along with the winner. Indeed when the network is congested, this number is of order N. It means that the burst transmission per packet would require a cumulated quantity of extra energy N times larger than the transmission of the packet itself. In other words, a user must expect to transmit N sequences in average before being the winner of the contention. If N is large (e.g. 1,000,000) this is unacceptable in terms of energy (up to an extra 60 dB margin).

Another drawback of this possible solution is that, by broadcasting bursts which are, by accumulation, N times more energetic than a packet transmission itself, it would create an interference radius far much larger than the typical range of the network. With a one million user network, this would increase the interference radius by a factor 1000 and create inacceptable long range disruptions.

Furthermore the uniqueness of the preamble sequence requires the need of a central management which can be complex.

The article by PHILIPPE JACQUET ET AL: "Cognitive networks: A new access scheme which introduces a Darwinian approach", WIRELESS DAYS (WD), 2012 IFIP, IEEE, 21 Nov. 2012 (2012-11-21), pages 1-6, XP032298475 describes a method for choosing the sequence of bursts of an access pattern, comprising the steps of computing a random integer X, and then generating a sequence of bursts corresponding to the computed random integer X.

Thanks to the steps of computing a random integer X, and then generating a sequence of bursts corresponding to the computed random integer X, the number of distinct sequences is much reduced. There may be a few identical sequences, but it is better to allow a few collisions to occur and to resolve them by retransmitting, rather than using N distinct sequences which lead to a large overhead, if a large number of sequences is needed.

The objective of the present invention is to provide an improved method to determine the random number X, so that the average energy cost E of a successful data packet transmission is below a targeted threshold.

Let us consider a given ratio k between the distributed interframe space DISF and the minislot. So k is the base for encoding X: 0, 1, . . . , k−1 to get a (0, k−1) sequence.

And let us consider a given number L of bursts in an access preamble pattern.

Without loss of generality, we can consider that the parameter X is generated by a given distribution of integers between 0 and $k^L-1$, or by large from 0 to infinity and then truncated up to $k^L-1$; and that the preamble key is the description in base k of the number X, so that the access preamble will contain L bursts and any larger X will always give a preamble that wins over a preamble made from a smaller value of integer X.

The average number of transmitters of the last burst is smaller than or equal to:

$$r(n, L, P) = n \sum_{i=0}^{i=k^L-1} P(X=i)(P(X \leq i))^{n-1} + nP(X \geq k^L)$$

where:
n is the number of actual primary users in access contention;
P is the access pattern probability distribution.

Notice that r(n,L,P)−1 is larger than the probability of collision on a packet and therefore 2−r(n,L,P) is a lower bound of the probability of successful transmission.

The average number of actually transmitted bursts dedicated to transmission, per packet preamble, includes all burst transmission, in particular the burst transmitted by losers among the n contenders. This average number of actually transmitted bursts is smaller than:

$$C(n, L, P) = nk \sum_{i=1}^{L} \sum_{j=1}^{j=k^i} P((j-1)k^{L-i} < X \leq jk^{L-i})(P(X \leq jk^{L-i}))^{n-1} + nLP(X \geq k^L)$$

The term $nLP(X \geq k^L)$ expresses the fact that the contenders with $X \geq k^L$ have a preamble key equal to BS(u) that is the binary k-sequence which encodes the number u, u being an integer between 0 and k−1.

Thus, if B is the energetic cost of one transmitted burst, and U is the energy cost of one single data packet transmission, then the average energy cost E(n,L,P) of a successful data packet transmission satisfies the inequality:

$$E(n, L, P) \leq \frac{C(n, L, P)B + U}{2 - r(n, L, P)}$$

SUMMARY OF THE INVENTION

The object of the invention is a method for choosing the sequence of bursts of an access pattern in the primary network of a cognitive wireless network comprising a primary and a secondary network, wherein this access pattern comprises an alternation of listen periods and signaling transmission periods, these periods having various lengths; comprising the steps of computing a random integer X, and then generating a sequence of bursts corresponding to the computed random integer X; wherein it comprises the steps of:

choosing a number p between 0 and 1 as a function of the wanted collision rate and choosing an integer L chosen of order log log of the maximum size N of the primary network, these parameters p and L being common to all devices in the primary network;

computing a random integer X having a geometric distribution with a probability p;

when $X<k^L$, where k is the ratio between the distributed interframe space and the mini slot, letting $m_1$, $m_2$, . . . , $m_i$, . . . , $m_L$ be the sequence that is encoded by X in a given base k; $m_i$ being integers chosen between 0 and k−1;

then deriving a preamble sequence from this integer sequence by taking $BS(k-1-m_1)$, $BS(k-1-m_2)$, . . . , $BS(k-1-m_L)$ as a preamble sequence, where BS(u) is the binary k-sequence which encodes the number u, u being an integer between 0 and k−1.

Thanks to these steps, the average energy cost per successful packet transmission is below a targeted threshold, for the following reasons.

The average energy cost per successful packet transmission E (n, L, P) is a function of:
n the number of actual primary users in access contention;
L the number of super-symbols (bursts) in the access patterns;
P the access pattern probability distribution.

In the following, the quantity k is the ratio between the distributed interframe space DIFS and the mini slot, and the base for encoding the random integer X.

In general, the mini slot is determined by the physical nature of the primary network, i.e. how fast the primary devices can switch from transmission to reception states. For example, k=10.

According to the invention, the parameters P and L must be chosen so that r(n,L,P)−1 is small enough. According to the invention, one should select:
1. the distribution P to be spread enough in order to reduce the probability that two contenders select the same value of X;
2. the parameter L to be large enough so that the probability $P(X \geq k^L)$ is kept sufficiently small, indeed much smaller than $$\frac{1}{N}$$

where N is the maximum size of the primary network.

Regarding the optimization with respect to the quantity C(n,L,P) since $$C(n, L, P) \leq nL \times \left( \sum_{j=1}^{j=k} P((j-1)k^{L-1} < X \leq jk^{L-1})(P(X \leq jk^{L-1}))^{n-1} + P(X \geq k^L) \right),$$

it suffices to optimize the quantity:

$$n\sum_{j=1}^{j=k} P((j-1)k^{L-1} < X \le jk^{L-1})(P(X \le jk^{L-1}))^{n-1};$$

since $(P(X \le jk^{L-1}))^{n-1} \le \exp(-(n-1)P(X \ge jk^{L-1}))$ and $$nP(X \ge (j-1)k^{L-1})\exp(-(n-1)P(X \ge jk^{k-1})) \le \left(\frac{P(X \ge (j-1)k^{L-1})}{P(X \ge jk^{L-1})} - 1\right)$$

(because $xe^{-x} \exp(-1)$ for all x>0), it suffices to minimize the maximum value of the ratio $$\frac{P(X \ge (j-1)k^{L-1})}{P(X \ge jk^{L-1})}.$$

Indeed, since $$\prod_{j=1}^{j=k} \frac{P(X \ge (j-1)k^{L-1})}{P(X \ge jk^{L-1})} = \frac{1}{P(X \ge k^L)}$$

the optimal value for a fixed and given value is when for all j the ratios are identical and satisfy:

$$\frac{P(X \ge (j-1)k^{L-1})}{P(X \ge jk^{L-1})} = (P(X \ge k^L))^{-1/k}.$$

It should be noted that this condition calls for a geometric law for P, since, in this case, the ratio $$\frac{P(X \ge y)}{P(X \ge y + k^{L-1})}$$

would be the same for all values of y.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which.

DETAILED DESCRIPTION OF THE PREFERRED EMBODIMENTS

An embodiment of the method according to the invention, for choosing the access pattern sequences in a node of a primary network, when the secondary network is a WiFi network, is described with reference to FIG. 4. In this embodiment, the distribution P is a truncated geometric distribution of parameter p; and L will be of order $\log_k \log N$ where N is the maximum size of the primary network and which is indeed very small even for tremendously large values of N. However this order of magnitude is necessary in order to have the quantity $P(X \ge k^L)=(1-p)^{k^L}$ smaller than $$\frac{1}{N}$$

and therefore a small value for r(n,L,P)−1. We also notice that the ratio $$\frac{P(X \ge y)}{P(X \ge y + k^{L-1})}$$

is always equal to $(1-p)^{-k^{L-1}}$ which is of order $N^{1/k}$ which kept reasonably small values when k is large enough. In particular, for k=10, N=1,000,000, L=3, p=0.02, the above mentioned formulas give:

r(n,L,P)−1=0.01 and C(n,L,P)=5.5.

Figure 1:
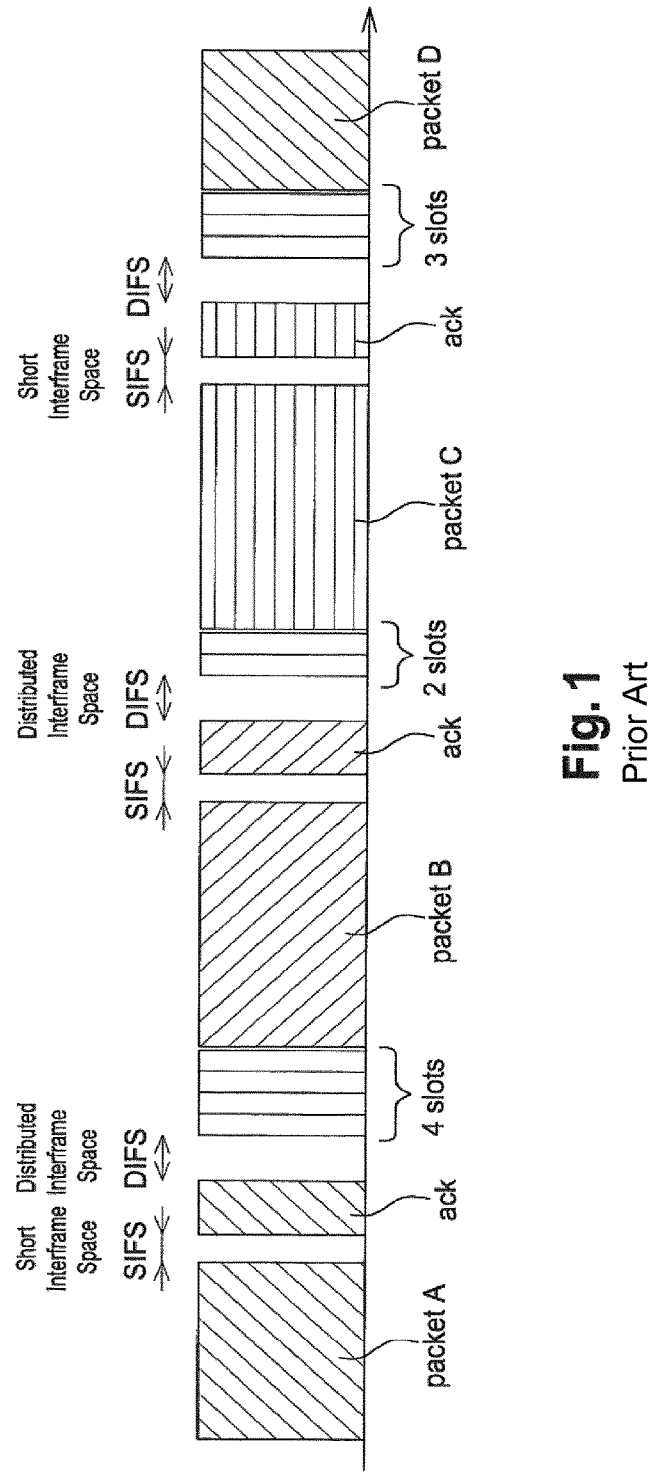
FIG. 1 (described above) represents an exemplary burst of data packets in a classical secondary network based on the IEEE 802.11 decentralized medium access scheme.
Figure 2:
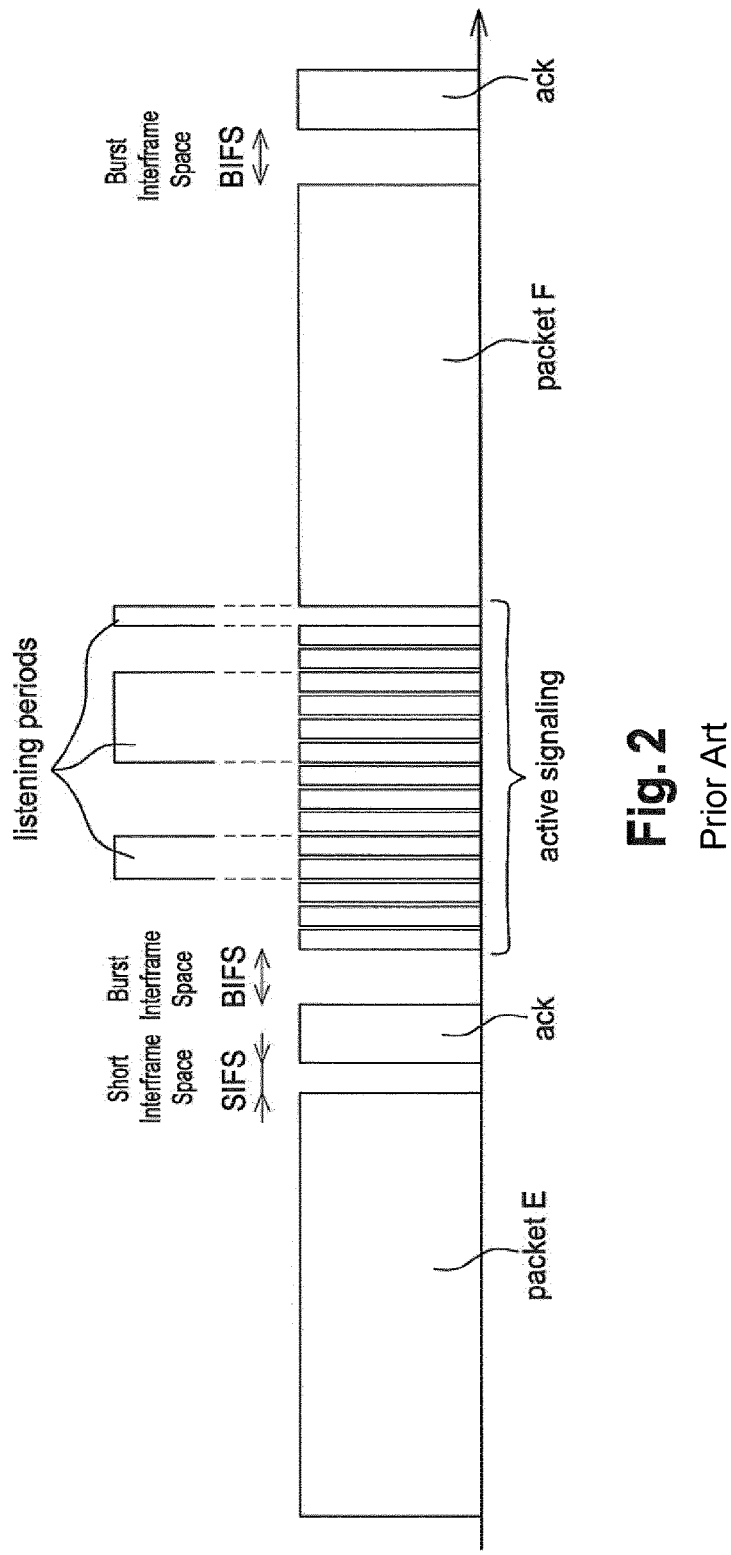
FIG. 2 (described above) represents an exemplary burst of data packets in a classical secondary network using a generalized carrier sense multiple access technique with active signaling, which is the original basis of the known protocol HiPERLAN type 1.
Figure 4:
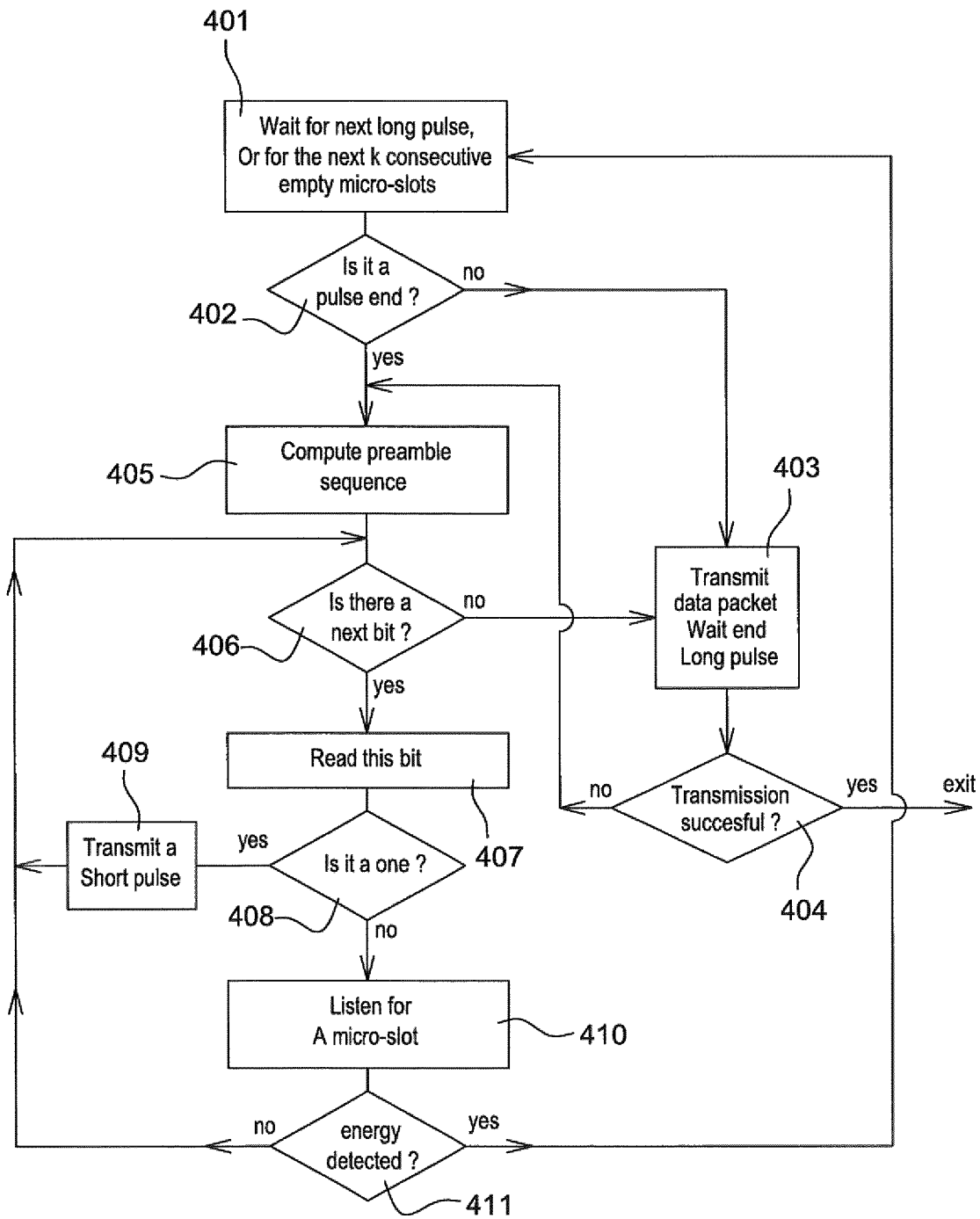
FIG. 4 represents one embodiment of the method according to the invention.

FIG. 4 is a flow chart illustrating this embodiment. The transmission of data packets is made in the same way as it is represented on FIG. 2; the only difference concerns the method for generating the access pattern sequences. A node of the primary network starts transmitting its access preamble after the last packet detected the last data packet originating from the secondary or the primary network. This can be detected by the detection of an energy drop on the channel after a sufficiently long carrier on period. The transmissions of all the preambles are synchronized by this event. Each access preamble is composed of micro time slots having a constant duration.

During each micro-slot of its preamble corresponding to a binary zero in its preamble sequence, the node is listening (reception). If it detects some energy, during such listening, it stops transmitting its preamble. This would mean that another node with a lexicographically higher preamble sequence is currently transmitting a signaling burst.

If a node aborts its preamble transmission, it computes a new preamble and waits for the end of the transmission of next packets to start again transmitting a new preamble.

If a node succeeds in transmitting its preamble, then it transmits its data packet. If the packet transmission is successful (for example if it is acknowledged by the intended receiver) then it quits the transmission protocol for this packet. Otherwise it computes a new preamble and start transmitting it after the end of the current packet transmission, or after the detection of a long carrier presence detected on the channel.

On FIG. 4, the flow chart comprises the following steps:

Step 401: A given node of the primary network is waiting for a next packet transmission or equivalently for a long carrier presence, or for the next k consecutive empty micro slots.

Step 402: If it does not detect the end of a long burst, then it makes the step 403. If it detects the end of a long burst, then it makes the step 405.

Step 403: It transmits a data packet, and then waits until the end of the long burst of data transmission before making step 404

Step 404: It checks whether the transmission of the data packet was successful (by detecting an acknowledgement message). If transmission is successful, it exits from this process. If the transmission is not successful, then it makes the step 405.

Step 405: It computes an access preamble sequence.

Step 406: It checks whether there is still a bit of this sequence to be transmitted. If yes, it makes the step 407. Else, i.e. if the access preamble sequence is finished, it makes step 403 for transmitting a data packet.

Step 407: It reads the bit detected at step 406.

Step 408: It checks whether the read bit is a one. If it is a one it makes the step 409. Else, it makes the step 410.

Step 409: The node transmits a signaling burst.

Step 410: The node listens for a micro time slot, and then it makes the step 411.

Step 411: It checks whether some energy has been detected during the listening at step 410. If some energy has been detected, it makes the wait 401 again. If no energy has been detected, it makes the step 406 again, i. e. checks whether there is still another bit of the sequence, to be transmitted.

Figure 5:
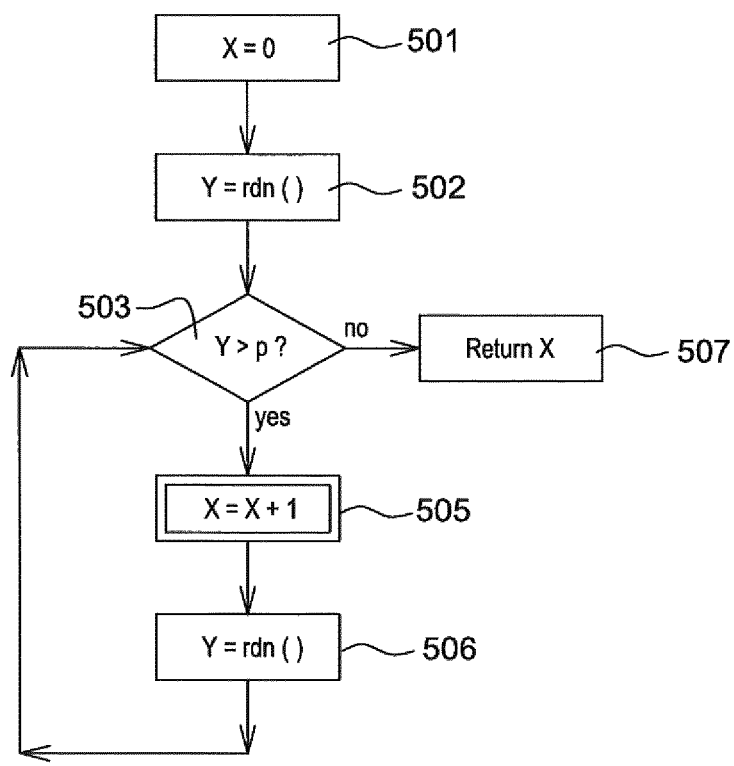
FIG. 5 represents a step of this embodiment, with more details.

FIG. 5 represents the step 405 of this embodiment, with more details. The step 405 computes an access preamble sequence according to the invention by the following steps:

Choosing a number p between 0 and 1 as a function of the wanted collision rate (the closer to zero the less collision rate) and an integer L. Indeed L is preferably chosen of order log log of the maximum size N of the primary network. These parameters should be common to all primary devices in the network. For instance, p=0.1 and L=3.

Computing a random integer X. Each node having a pending data packet computes a random integer X with a geometric distribution with probability p. One possible way to compute the number X is to proceed recursively.

In this embodiment, computing a random integer X having a geometric distribution with probability p, comprises the following steps:

Step 501: X=0 (initialization);

Step 502: Y=rdn( ) where rdn( ) is a pseudo-random number generator which returns a real number uniformly distributed between 0 and 1;

Steps 503-506: While Y is greater than p, compute X=X+1 and then compute Y=rdn( )

Step 503-507: When Y is lower or equal to p then return X.

Then X is used to determine a preamble sequence, as follows:

Let x be an integer, the probability that X=x is equal to $(1-p)^x p$

If $X \geq k^L$, then taking $BS(k-1-m_1)$, $BS(k-1-m_2)$, ..., $BS(k-1-m_L)$ (where $BS(u)$ is the binary k-sequence which encodes the number u, u being an integer between 0 and k-1, actually $BS(u)$ is a sequence of u consecutive "0" followed by a "1") as a preamble sequence. So the preamble sequence comprises L symbols $B(0)$, or in other words the preamble sequence will consist in L signaling bursts without empty mini slots between them (in this case the individual signaling bursts can be merged into a unique burst of appropriate length).

Otherwise, i. e. when $X<k^L$, letting $m_1$, $m_2$, ..., $m_i$, ..., $m_L$ be the sequence that encode X in base k, wherein $m_i$ (being integers chosen between 0 and k-1.

Then deriving a preamble sequence from this integer sequence by taking $BS(k-1-m_1)$, $BS(k-1-m_2)$, ..., $BS(k-1-m_L)$ as a preamble sequence.

Figure 3:
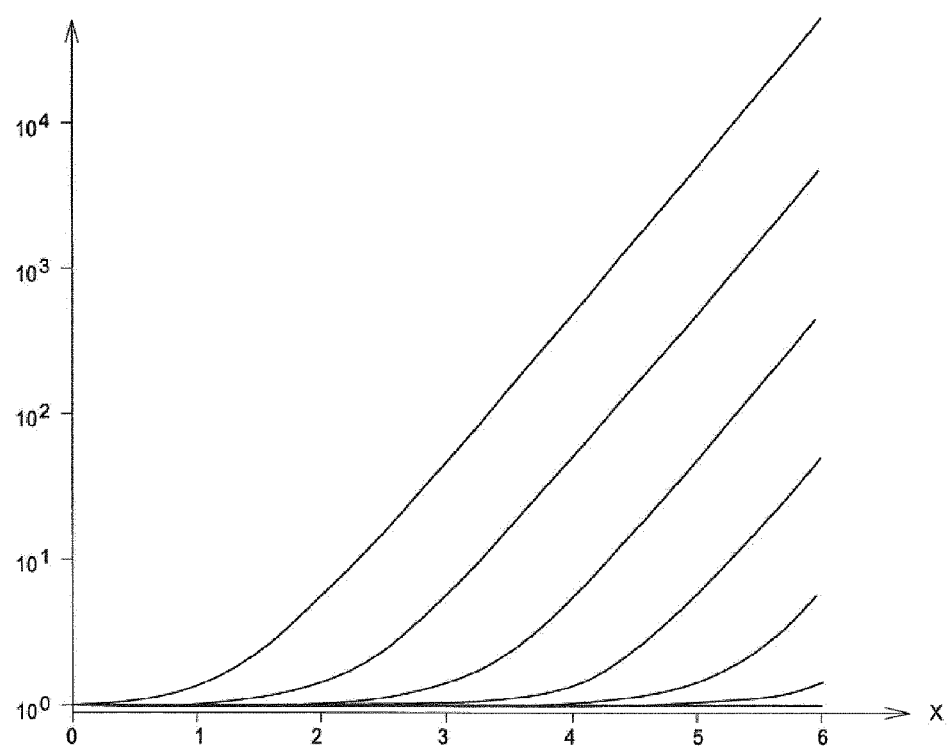
FIG. 3 (described above) represents graphs of the average number of users simultaneously transmitting their $i^{th}$ signaling burst, when each preamble pattern comprise a sequence of signaling burst positions chosen according to the second possible method.
Figure 6:
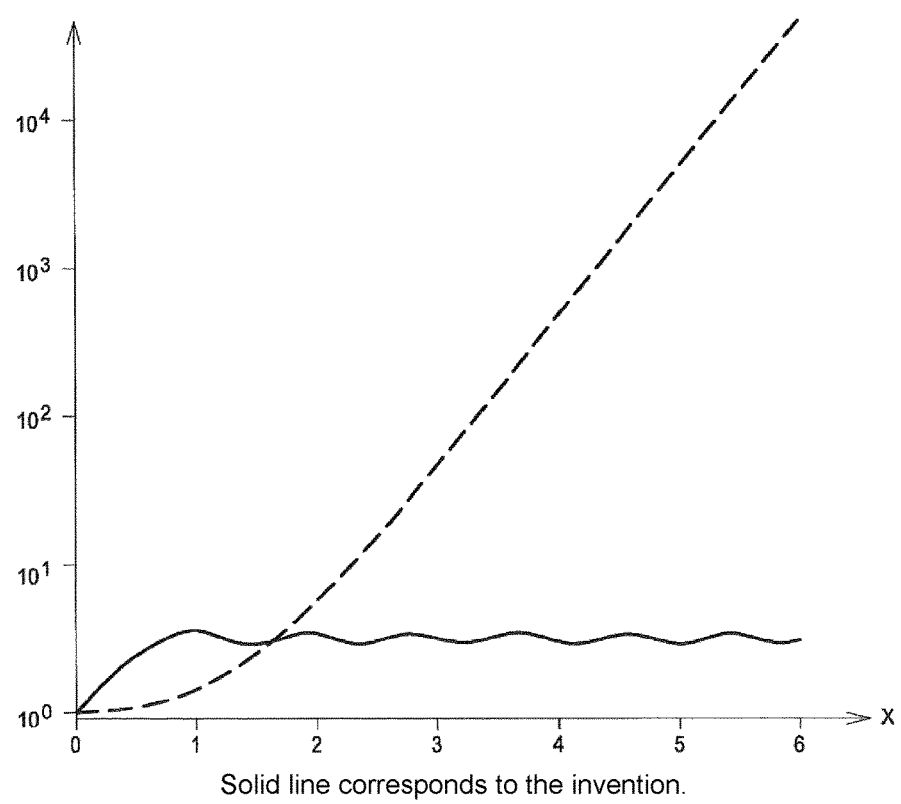
FIG. 6 represents graphs of the average number of users simultaneously transmitting their $i^{th}$ signaling burst, for i=1 to 6, from left to right, versus the number of users ($10^x$), on logarithmic scales, when each of the patterns is chosen by means of the method according to the invention.

FIG. 6 represents the average number of actual simultaneous transmitters of a given preamble sequence as a function of the number of simultaneous contenders ($10^x$, up 1,000,000 contenders). The scales are logarithmic. The dashed graph corresponds to the use of known preambles as on FIG. 3 (The actual number of transmitters grows linearly with the contenders). The solid graph corresponds to the use of the method according to the invention. This latter is almost flat. This flat graph shows that the method according to the invention gives an energy viable solution for a primary network predating a WiFi secondary network. The energy saving maybe several orders of the second possible solution described above. In the second possible solution, the energy wasted to transmit a packet can be of the order of N times the energy to transmit a packet in WiFi, where N is the number of connected terminals. If N is 100 or 1,000 this the second known solution is not viable on a portable device.

As above mentioned, the average number of transmitters of the last burst is smaller than or equal to:

$$r(n, L, P) = n \sum_{i=0}^{i=k^L-1} P(X=i)(P(X \leq i))^{n-1} + nP(X \geq k^L)$$

and $r(n,L,P)-1$ is larger than the probability of collision on the packet and therefore $2-r(n,L,P)$ is a lower bound of the probability of successful transmission.

Figure 7:
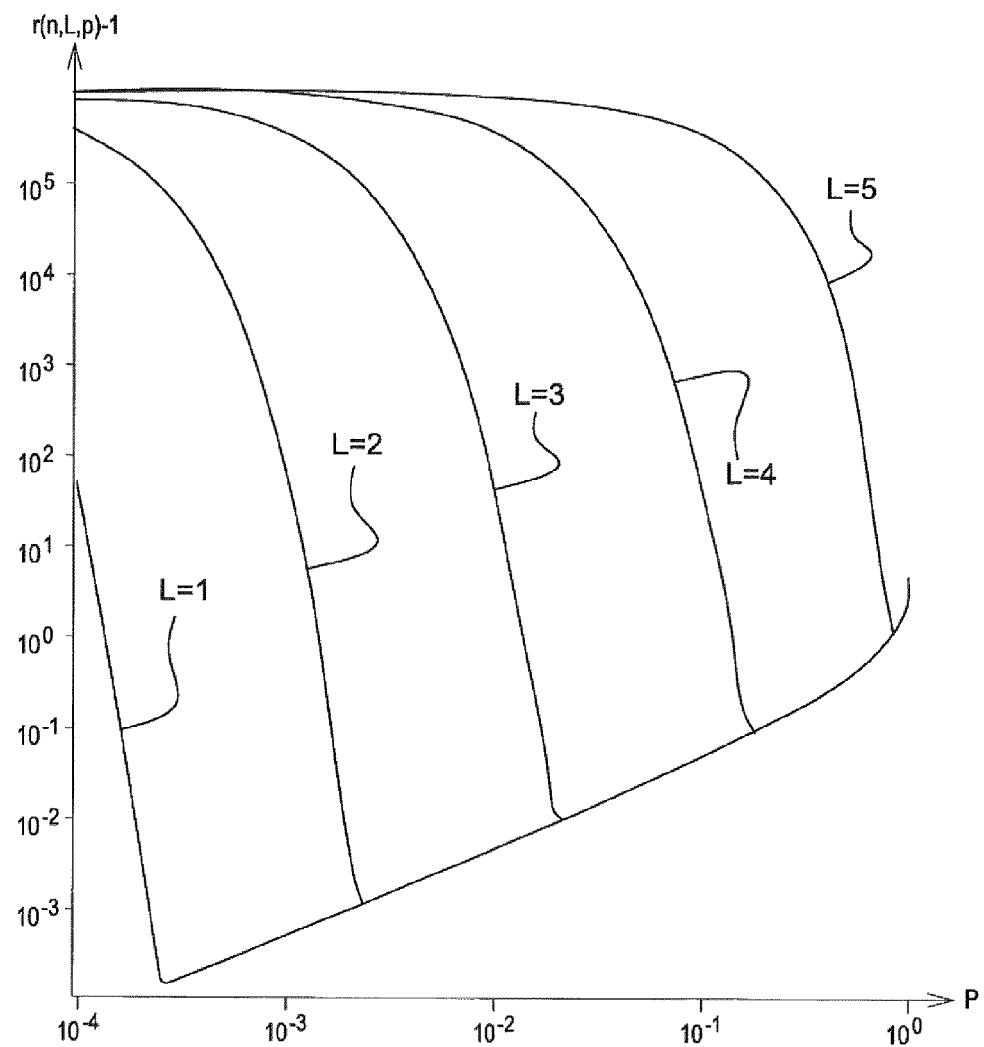
FIG. 7 represents graphs showing that the probability of collision decreases as the integer L increases.

FIG. 7 represents the values of $r(n,L,p)-1$ versus parameter p, for N=1,000,000, k=10 and L=5, 4, 3, 2, 1, from left to right.

This FIG. 7 shows that the probability of collision decreases as the integer L increases. Meanwhile, for a fixed value of integer L, there is a minimum value of $r(n,L,p)$ which is attained by an optimal value of p (for instance p=0.02 for L=3). This comes form the fact that when p increases, then the probability to have a collision on the X values increases; and when p decreases the overflow probability (i.e. the probability that $X \geq k^L$) increases. The minimum values of $r(n,L,p)$ decreases when L increases.

Figure 8:
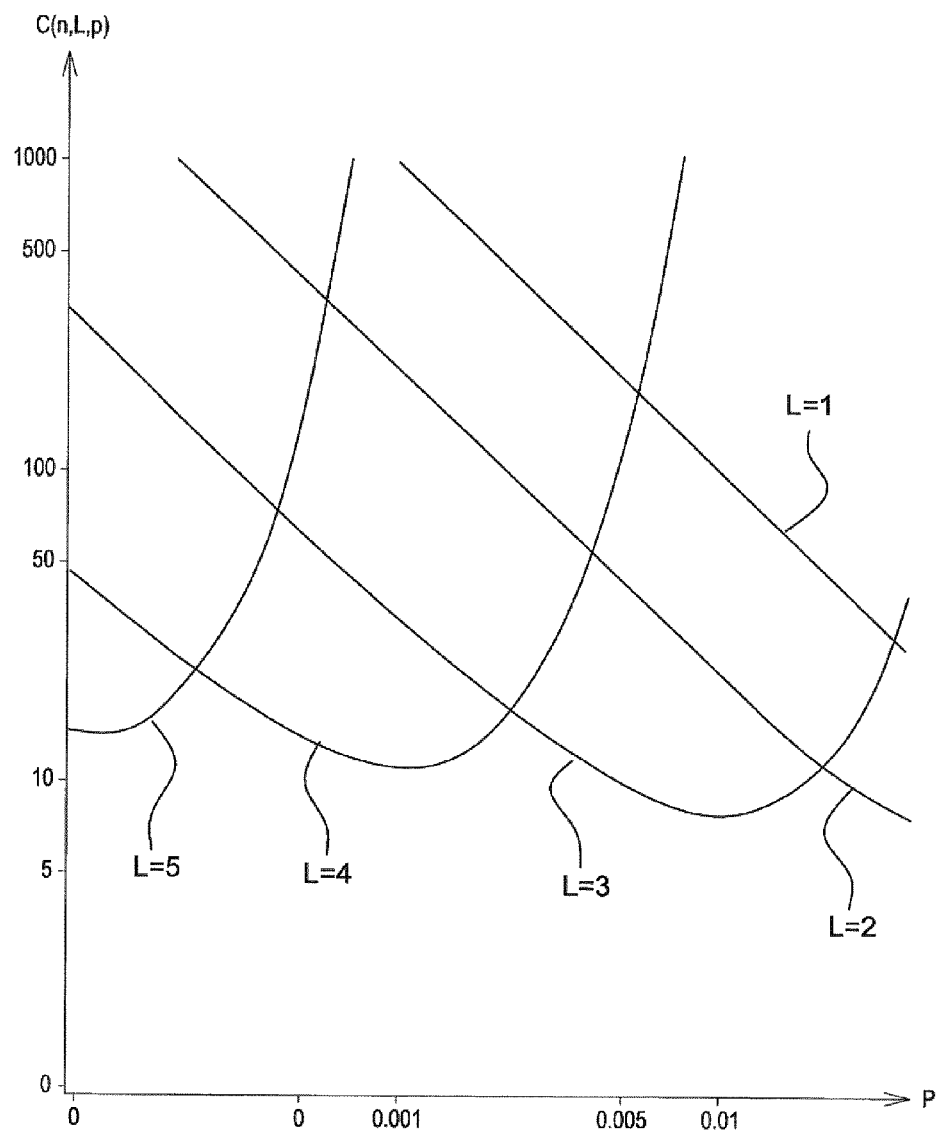
FIG. 8 represents graphs showing that the graph of the energy cost per packet transmission has a cupsy shape.

FIG. 8 represents the values of C(n,L,p) versus p, for N=1,000,000, k=10, and L=1, 2, 3, 4, 5 from right to left. This FIG. 8 shows that the graph of the energy cost per packet transmission has a cupsy shape.

Therefore the ratio $$\frac{C(n, L, p)}{2 - r(n, L, p)}$$

has an even more cupsy shape which, for a given value of L, attains a minimal value for approximately the same value of p that minimizes r(n,L,p). However the optimal values depend of the value of the burst energy B and the packet energy U in the global energy formula.

The method according to the invention can be implemented with any distribution that accepts A and B strictly positive and such that, for all positive value of y such that 0≤y<k and that P satisfies the two following conditions:

$$P(Y=y) < A\delta y^{\delta-1} p(1-p)^{y^k}$$

$$P(Y>y) < B(1-p)^{y^k}$$

In another embodiment of the method according to the invention, computing a random value X comprises the steps of producing a random number u uniformly in the interval [0,1], by means of a pseudo-random number generator, and then taking:

$$X = \left\lfloor \frac{\log u}{\log(1-p)} \right\rfloor$$

Where $\lfloor x \rfloor$ indicates the integer part of a real number x.

With the method according to the invention, each new band open to WiFi has the potentiality to duplicate the existing market of WiFi. The technology burden remains on the primary network, and not on the secondary network.

The method according to the invention can be implemented by means of a computer running a program comprising computer-executable instructions for performing the method when the program is run on this computer.

There is claimed:

1. A method for choosing a sequence of bursts of an access pattern in a primary network of a cognitive wireless network comprising the primary network and a secondary network, wherein the access pattern comprises an alternation of listen periods and signaling transmission periods having various lengths;

the method comprising computing a random integer X, and generating the sequence of bursts corresponding to the computed random integer X;

wherein the computing the random integer X comprises:
    choosing a number p between 0 and 1 as a function of a desired collision rate and choosing an integer L chosen of order $\log_k \log N$, where k is a given base and N is maximum users of the primary network, these parameters p and L being common to all devices in the primary network;
    computing the random integer X having a probability P, where P is a truncated geometric distribution of p;
    when $X < k^L$, letting $m_1, m_2, \ldots, m_j, \ldots, m_L$ be an integer sequence that is encoded by X in the given base k; $m_i$ being integers chosen between 0 and k−1;
    deriving a preamble sequence of the primary network from the integer sequence by taking BS(k−1−$m_1$), BS(k−1−$m_2$), . . . , BS(k−1−$m_L$) as the preamble sequence, where BS(u) is a binary k-sequence which encodes a number u, u being an integer between 0 and k−1, thereby an average energy cost of a successful data packet transmission is below a target threshold.

2. A non-transitory digital data storage medium storing a set of machine executable program instructions, which, when executed on a computer, cause the computer to perform a method according to claim 1.

3. A non-transitory computer-readable medium having stored thereon a computer program product comprising computer-executable instructions for performing a method when the computer program is run on a computer, the method comprising claim 1.

* * * * *